US012756530B2

(12) United States Patent
Chatterjee et al.

(10) Patent No.: US 12,756,530 B2
(45) Date of Patent: Oct. 6, 2026

(54) TIMING FOR NON-OVERLAPPING SUB-BAND FULL DUPLEX (SBFD) OPERATIONS IN 5G NR

(71) Applicant: Intel Products IP LLC, Santa Clara, CA (US)

(72) Inventors: Debdeep Chatterjee, San Jose, CA (US); Gang Xiong, Beaverton, OR (US); Salvatore Talarico, Los Gatos, CA (US); Yi Wang, Beijing (CN); Yingyang Li, Beijing (CN)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/371,632

(22) Filed: Sep. 22, 2023

(65) Prior Publication Data

US 2024/0014995 A1 Jan. 11, 2024

Related U.S. Application Data

(60) Provisional application No. 63/410,504, filed on Sep. 27, 2022.

(51) Int. Cl.
*H04L 5/14* (2006.01)
*H04L 5/00* (2006.01)

(52) U.S. Cl.
CPC .............. *H04L 5/14* (2013.01); *H04L 5/0046* (2013.01)

(58) Field of Classification Search
CPC ....... H04L 5/14; H04L 5/0046; H04L 5/0094; H04W 72/0453
See application file for complete search history.

(56) References Cited

U.S. PATENT DOCUMENTS

| | | | | |
|---|---|---|---|---|
| 11,930,469 | B2 * | 3/2024 | Zhang | H04L 5/16 |
| 12,376,089 | B2 * | 7/2025 | Abotabl | H04W 72/0453 |
| 2024/0049200 | A1 * | 2/2024 | Zhang | H04L 5/1469 |
| 2024/0073911 | A1 * | 2/2024 | Abotabl | H04L 1/08 |

* cited by examiner

*Primary Examiner* — Chandrahas B Patel
(74) *Attorney, Agent, or Firm* — Schwegman Lundberg & Woessner, P.A.

(57) ABSTRACT

A User Equipment (UE) configured for non-overlapping Sub-Band Full Duplex (SBFD) operation communicates during SBFD symbols that are non-overlapping in time. Each of the SBFD symbols comprise at least a DL subband and an UL subband within a TDD carrier within a BWP. To communicate during the SBFD symbols, the UE transmits uplink transmissions only within resource blocks (RBs) that are both in an active UL BWP configured to the UE and the UL subband of one of the SBFD symbols and receives downlink transmissions only within RBs that are both in an active DL BWP configured to the UE and in the DL subband of one of the SBFD symbols. The uplink transmissions during the SBFD symbols are transmitted with a timing-advance offset to adjust advancement in initiation of the uplink transmission relative to DL symbol timing at the UE within an SBFD symbol.

14 Claims, 7 Drawing Sheets

TIMING FOR NON-OVERLAPPING SUB-BAND FULL DUPLEX (SBFD) OPERATIONS IN 5G NR

PRIORITY CLAIM

This application claims priority under 35 USC 119(e) to U.S. Provisional Patent Application Ser. No. 63/410,504, filed Sep. 27, 2022 [reference number AE9213-Z] which is incorporated herein by reference in its entirety.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Time Division Duplex (TDD) is now widely used in commercial 5G NR deployments. In TDD, the time domain resource is split between downlink and uplink symbols. Allocation of a limited time duration for the uplink in TDD can result in reduced coverage and increased latency for a given target data rate. Full-duplex communications may be used to increase capacity, however full-duplex communications present other issues, such as interference and switching time, that need to be addressed.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In accordance with some embodiments, a generation Node B (gNB) configured for Sub-Band Full Duplex (SBFD) communication in a fifth-generation new radio (5G NR) network may communicate with two or more User Equipment (UEs) during SBFD symbols. During any one or more of the SBFD symbols, a downlink transmission may be transmitted to at least one of the UEs simultaneously with reception of an uplink transmission from at least another of the UEs. The SBFD symbols may span the carrier bandwidth and may comprise at least a downlink (DL) subband and an uplink (UL) subband within the carrier bandwidth. To communicate with the two or more UE simultaneously during the SBFD symbols, the gNB may configure the UEs that are to transmit during one or more of the SBFD symbols with timing-advance offset information to be used by the UEs to adjust a configured timing-advance for initiating an uplink transmission relative to downlink symbol timing within the one or more SBFD symbols. A timing-advance offset may, for example, delay an uplink transmission of during one or more of the SBFD symbols that follows a downlink symbol. This offset or delay, relative to the timing-advance, may provide a UL-DL switching time gap when the SBFD symbol follows a DL symbol.

In accordance with some embodiments, a User Equipment (UE) configured for Sub-Band Full Duplex (SBFD) operation in a fifth-generation new radio (5G NR) network may communicate with a generation Node B (gNB) during SBFD symbols. Each of the SBFD symbols may span an active DL bandwidth part (BWP) configured to the UE. Each of the SBFD symbols may comprise at least a downlink (DL) subband and an uplink (UL) subband within the active DL bandwidth part (BWP). To communicate during the SBFD symbols, the UE may be configured to transmit uplink transmissions within the uplink subband to the gNB. The uplink transmissions during the SBFD symbols may be transmitted with a timing-advance offset (e.g., $N_{TA,\ offset}$) to adjust the advancement in initiation of the uplink transmission relative to DL symbol timing at the UE within an SBFD symbol. When the UE is transmitting the uplink transmissions within the uplink subband to the gNB, there may be a concurrent transmission of a downlink transmission to another UE from the gNB in the downlink subband. These embodiments, as well as others, are described in more detail below.

Figure 1A:
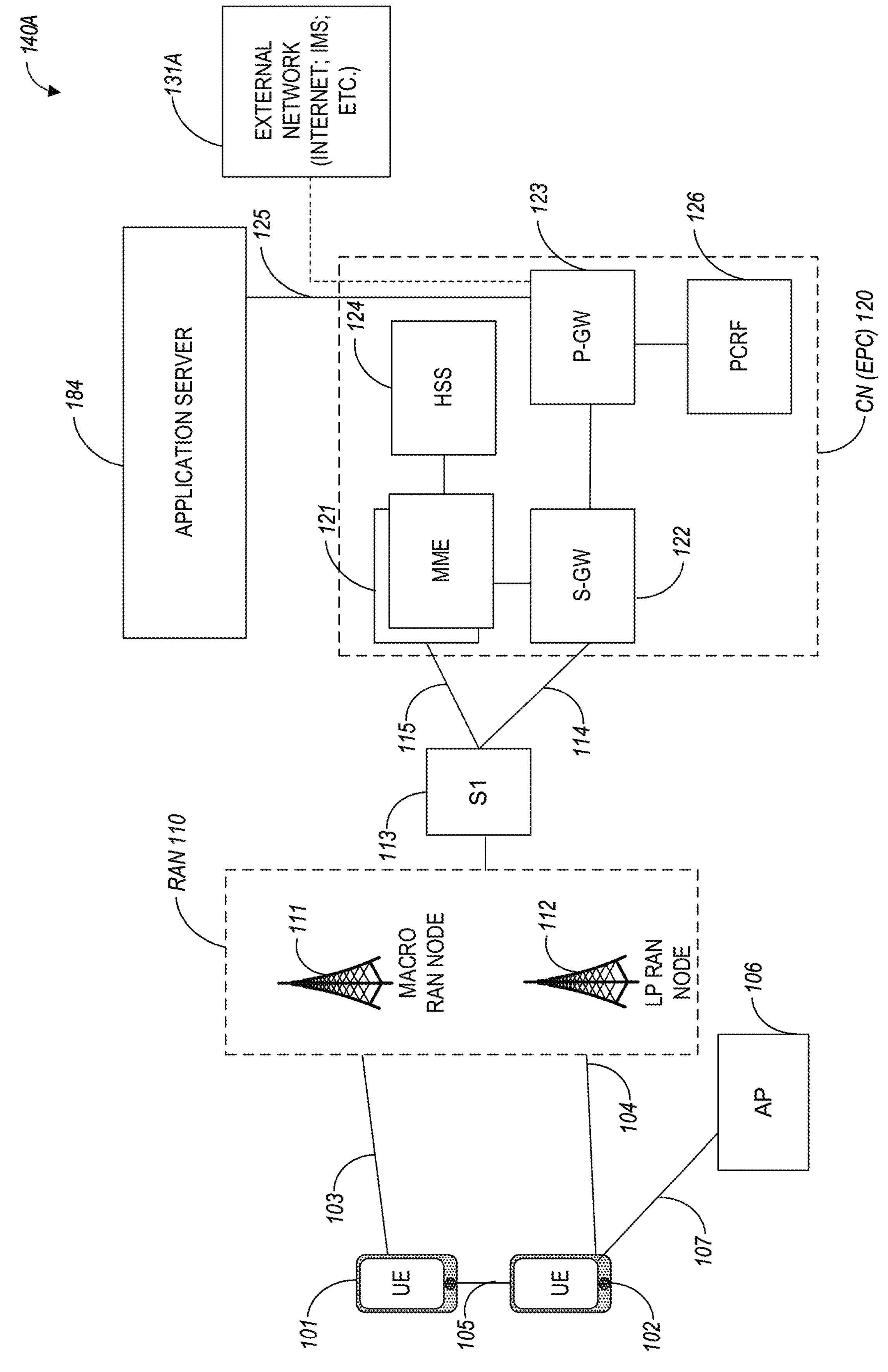
FIG. 1A illustrates an architecture of a network, in accordance with some embodiments.

FIG. 1A illustrates an architecture of a network in accordance with some embodiments. The network 140A is shown to include user equipment (UE) 101 and UE 102. The UE 101 and UE 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UE 101 and UE 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UE 101 and UE 102 can comprise an Internet-of-Things (IoT) UE or a Cellular IoT (CIoT) UE, which can comprise a network access layer designed for low-power IoT applications utilizing short-lived UE connections. In some embodiments, any of the UE 101 and UE 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some embodiments, any of the UE 101 and UE 102 can include enhanced MTC (eMTC) UEs or further enhanced MTC (FeMTC) UEs.

The UE 101 and UE 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UE 101 and UE 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UE 101 and UE 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the RAN nodes 111 and 112 can be transmission/reception points (TRPs). In instances when the RAN nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node, and one or more RAN nodes for providing femtocells or picocells (e.g., cells having smaller coverage areas, smaller user capacity, or higher bandwidth compared to macrocells), e.g., low power (LP) RAN node.

Any of the RAN nodes 111 and 112 can terminate the air interface protocol and can be the first point of contact for the UE 101 and UE 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the RAN nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the core network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UE 101 and UE 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. In these embodiments, the RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
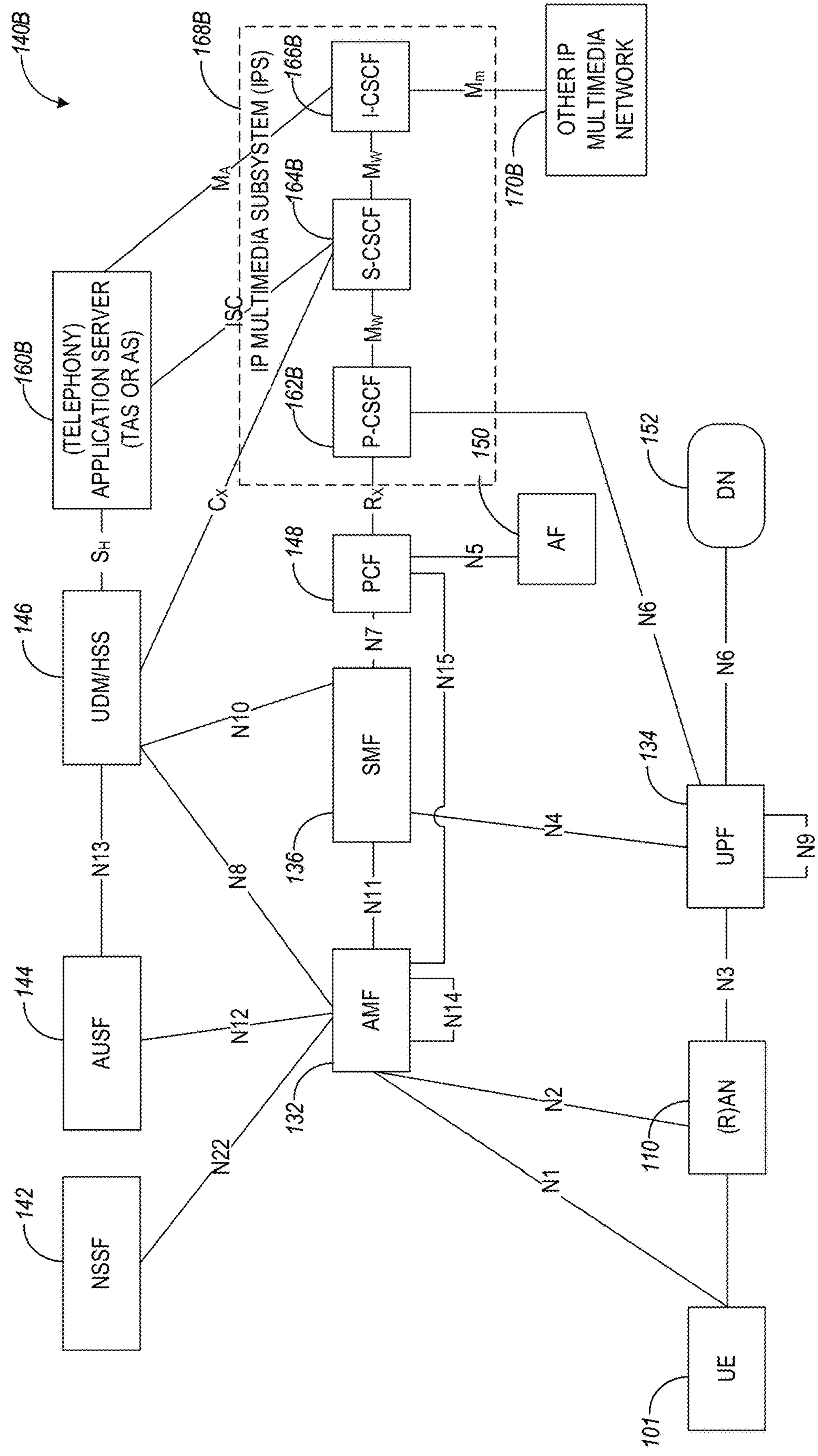
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162B, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM/HSS 146 and the AMF 132, not shown), N9 (between two UPFs 134, not shown), N10 (between the UDM/HSS 146 and the SMF 136, not shown), N11 (between the AMF 132 and the SMF 136, not shown), N12 (between the AUSF 144 and the AMF 132, not shown), N13 (between the AUSF 144 and the UDM/HSS 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
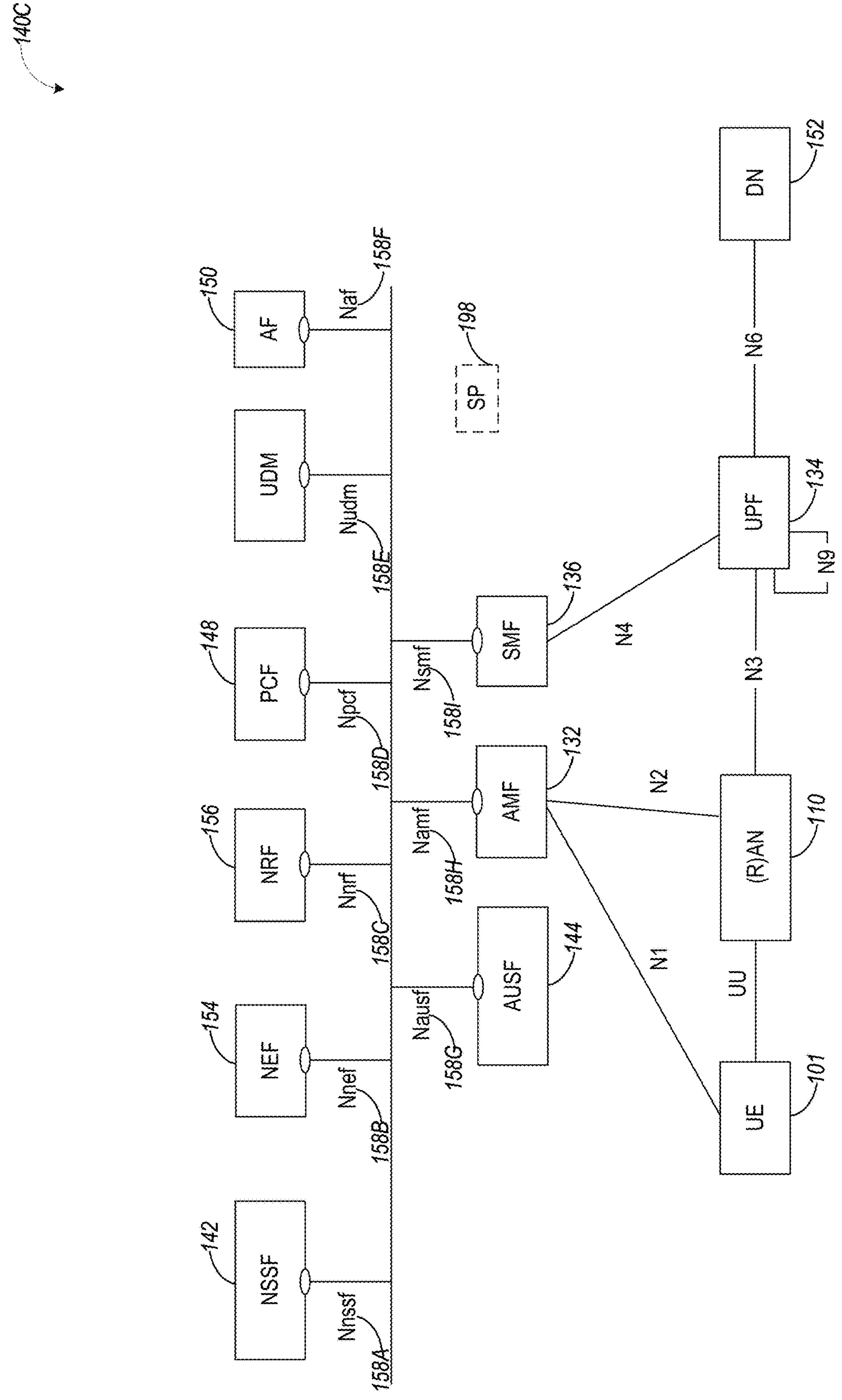

FIG. 1C illustrates a 5G system architecture 140C and a service-based representation. In addition to the network entities illustrated in FIG. 1, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM/HSS 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

As mentioned above, Time Division Duplex (TDD) is now widely used in commercial NR deployments. In TDD, the time domain resource is split between downlink and uplink symbols. Allocation of a limited time duration for the uplink in TDD can result in reduced coverage and increased latency for a given target data rate. To improve the performance for UL in TDD, simultaneous transmission/reception of downlink and uplink respectively, referred to as full duplex communication can be considered. In this regard, the case of Non-Overlapping Sub-Band Full Duplex (SBFD) at the gNB is expected to be studied further in 3GPP. For SBFD, within a carrier bandwidth, some bandwidth can be allocated as UL and some bandwidth can be allocated as DL within the same symbol, however the UL and DL resources are non-overlapping in frequency domain. Under this operational mode, at a given symbol, a gNB can simultaneously transmit DL signals and receive UL signals, while a UE may only transmit or receive at a time.

For a UE that may be provided with information for SBFD operations at gNB, the UE may identify a SBFD symbol and a non-SBFD symbol. The UE may behave differently for a SBFD symbol and a non-SBFD symbol. Embodiments disclosed herein relate to the determination of UL transmission timing or DL receiving time and the handing of the DL and UL channel/signals without sufficient gap. Embodiments disclosed herein enable flexible resource configuration and efficient operation in full duplex system.

Figure 1D:
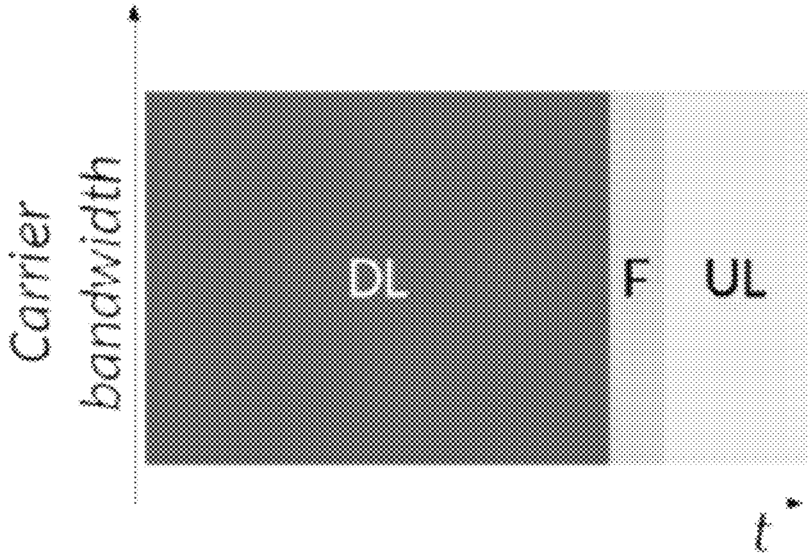
FIG. 1D illustrates a unidirectional downlink/uplink (DL/UL) resource allocation in a serving cell, in accordance with some embodiments.

FIG. 1D illustrates a unidirectional downlink/uplink (DL/UL) resource allocation in a serving cell, in accordance with some embodiments. For a serving cell with legacy TDD operation, DL/UL resources can be configured unidirectionally in time domain. The time domain granularity can be an OFDM symbol. A symbol can be either a DL symbol, or an UL symbol, or flexible symbol as shown via the example in FIG. 1D. Further, such attribution between DL/UL/Flexible can be indicated to a UE via semi-static or dynamic signaling with some differences in UE behavior for handling of Flexible symbols depending on the whether the indication is based on semi-static configuration or dynamic signaling (e.g., using DCI format 2_0).

Figure 2:
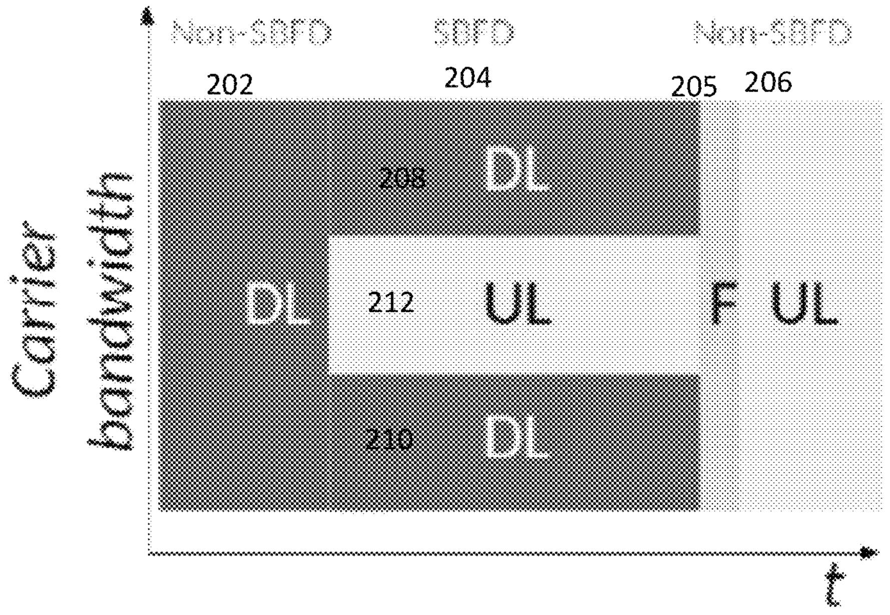
FIG. 2 illustrates a Sub-Band Full Duplex (SBFD) based DL/UL resource allocation in a serving cell, in accordance with some embodiments.

FIG. 2 illustrates a Sub-Band Full Duplex (SBFD) based DL/UL resource allocation in a serving cell, in accordance with some embodiments. For a serving cell with SBFD operation, a symbol can be used to map both DL and UL physical channels or signals. Thus, for a given PRB in a symbol, the resources may be identified as DL, UL, or flexible resources as illustrated in FIG. 2. As shown in FIG. 2, in a symbol, frequency resources may be divided into DL/UL/Flexible resources in different non-overlapped sub-bands. Here and in the rest of the disclosure, a "sub-band" corresponds to a set of physical resources within a carrier that are contiguous in frequency, e.g., a number of consecutive Physical Resource Blocks (PRBs) on the Common Resource Block (CRB) grid.

In the following, a "SBFD symbol" (may also be referred to as "Full Duplex (FD) symbol for brevity) implies a symbol in which the gNB may transmit in the DL and receive in the UL simultaneously. Such a symbol may be identified by a UE based on configuration of SBFD operation (e.g., when configured with at least one DL and at least one UL sub-band in the symbol), or based on one or more of: TDD configuration, dynamic slot formats (e.g., via DCI format 2_0), higher layer configuration, or dynamic L1 signalling of transmission or reception occasions.

DL/UL Timing in a Full Duplex System

For UL transmission, UE shall start $T_{TA}=(N_{TA}+N_{TA,offset})T_c$ before the start of the corresponding symbol boundary based on DL reception timing, where $N_{TA,offset}$ is configured by gNB and $N_{TA}$ is indicated by gNB by TA command. The value of $N_{TA,offset}$ can be at least one of 0, 25600*Tc or 39936*Tc, where $T_c=1/(\Delta f_{max}\cdot N_f)$, $\Delta f_{max}=480\cdot 10^3$ Hz and $N_f=4096$.

Typically, in TDD system, $N_{TA,offset}>0$ can be configured so that boundary of UL is earlier than the boundary for DL to provide sufficient gap for UL-to-DL switching. $N_{TA,offset}$ is applied to all UL transmissions. But for SBFD system, un-aligned timing at gNB for UL/DL in a SBFD symbol would be undesirable, e.g., for interference handling.

In one embodiment, gNB may configure single $N_{TA,offset}$, which is applicable to all symbols for UL transmission. For example, $N_{TA,offset}=0$, and gNB avoid scheduling last one or several symbols for any transmission right before the start of DL transmission, or avoid scheduling first one or several symbols for any transmission right after the end of UL transmission, thus the gap for UL-to-DL switching can be generated. Alternatively, $N_{TA,offset}>0$, and gNB handles interference by additional processing to reduce the impact of un-aligned symbol boundary for DL and UL signals/channels. Furthermore, considering the arriving time of UL signals/channels at gNB side is also determined by $N_{TA}$, gNB may align the symbol boundary of UL and DL signals/channels by setting a proper value for $N_{TA}$ while the symbol index for UL and DL signals/channels can be different, e.g., the symbol boundary of i-th UL symbol is aligned with (i−1)-th DL symbol.

In another embodiment, gNB may configure more than one values of $N_{TA,offset}$ for two or more sets of time domain resources. In one option, the set of time domain resources may be configured by gNB, e.g., gNB configures symbols/slots index for a set of time domain resources, and gNB can configure more than one sets. In another option, the set of time domain resources may be derived by specific configuration information. Taking SBFD configuration as the specific configuration information as an example, e.g., one set of time domain resources may be for SBFD symbols, and another set of time domain resources for non-SBFD symbols. In one example, the SBFD or non-SBFD symbol may be determined by cell-specific configuration signaling for SBFD operation. In another example, the SBFD or non-SBFD symbol may be determined by semi-static configuration signaling for SBFD operation, e.g., cell-specific and/or UE-specific configuration for SBFD operation. In another example, the SBFD or non-SBFD symbol may be determined by semi-static configuration signaling and/or dynamic signaling for SBFD operation. In another option, the set of time domain resources may alternatively or in addition to the above, depend on mTRP configuration, e.g., there can be 4 sets of resources with 4 $N_{TA,offset}$ values in case of 2 TRPs. In another option, the set of time domain resources may alternatively or in addition to the above, depend on a type of UL transmission in a flexible symbol, such that a first value of $N_{TA,offset}$ may apply to a first type of UL transmission in a flexible symbol and a second value of $N_{TA,offset}$ may apply to a second type of UL transmission in a flexible symbol. In one example, a first type of UL transmission in a flexible symbol may correspond to the flexible symbol being considered as an UL symbol while a second type of UL transmission in a flexible symbol may correspond to the flexible symbol being considered as a DL symbol. Accordingly, a gNB may schedule a UE1 for UL transmission and a UE2 for DL reception in a flexible symbol without indication of SBFD symbol for the flexible symbol.

In one option, the gNB may configure more than one $N_{TA,offset}$, and gNB can indicate/configure which one of $N_{TA,offset}$ is applied for a UL signal/channel. In one example, gNB indicate which $N_{TA,offset}$ is applied for a dynamically scheduled UL signal/channel in UL grant or DL assignment. In another example, gNB configures which $N_{TA,offset}$ is applied for a higher-layer configured UL signal/channel, e.g., for CG PUSCH. In another example, if gNB configures multiple sets of UL signal/channel, gNB can configure which $N_{TA,offset}$ is applied for the set of UL signal/channel, e.g., a first set of PUCCH resources for a first set of time domain resources and a second set of PUCCH resources for a second set of time domain resources, and two separate $N_{TA,offset}$ for each set of PUCCH resources.

In another example of the embodiment, one of the values of $N_{TA,offset}$ may be pre-defined (e.g., set to zero).

In another embodiment, gNB may configure one $N_{TA,offset}$, and pre-defined offset can be applied to achieve different effective $N_{TA,offset}$ for different set of time domain resources. The pre-defined offset can be determined by frequency band. For example, two pre-defined offsets are specified for FR1 and FR2 respectively. UE may apply $N_{TA,offset}$ for SBFD symbols and $N_{TA,offset}$+pre-defined offset for non-SBFD symbols, and the value of pre-defined offset is determined by frequency range (FR1 or FR2).

As discussed above, $T_{TA}$ includes both $N_{TA}$ and $N_{TA,offset}$. In one embodiment, for $N_{TA}$, a single value is applied for all symbols for UL transmission. Alternatively, separate $N_{TA}$ can be supported which is applied for different time domain resources. In one option, single $N_{TA}$ is applied regardless of the number of configured $N_{TA,offset}$. In another option, if more than one $N_{TA,offset}$ is configured, gNB may configure single $N_{TA}$ applied to multiple $N_{TA,offset}$, or gNB may configure separate $N_{TA}$ applied to each $N_{TA,offset}$.

For above embodiments, in one option, UE does not expect to be scheduled a UL transmission (e.g., PUSCH/PUCCH) over symbols associated with different UL timing. In another option, UE may expect to be scheduled a UL transmission over symbols associated with different UL timing and UE apply one UL timing according to pre-defined rule (e.g., the UL timing associated with $1^{st}$ symbol of the UL transmission).

Figure 3:
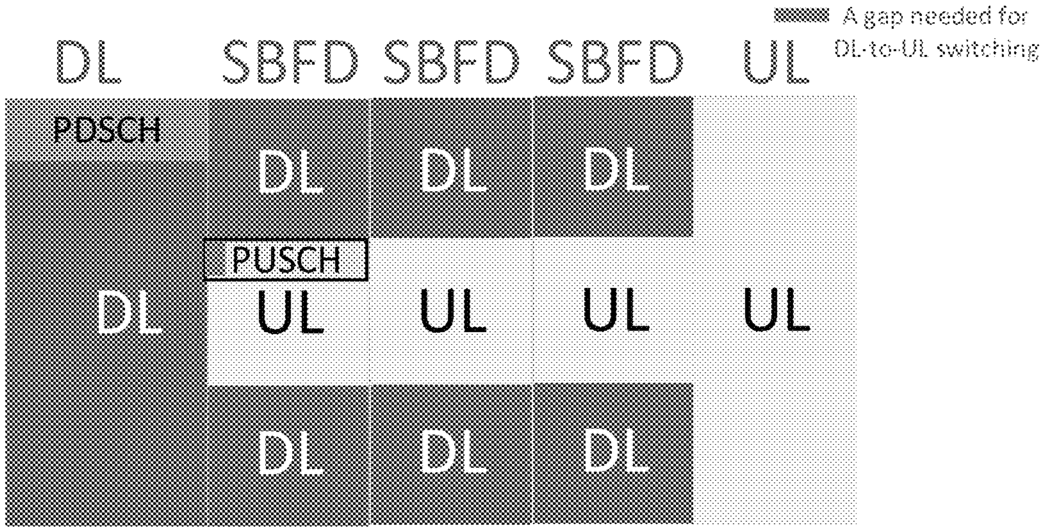
FIG. 3 illustrates an SBFD based DL/UL resource allocation in a serving cell with back-to-back physical downlink shared channel (PDSCH) and physical uplink shared channel (PUSCH) scheduling in a downlink and an SBFD slot, in accordance with some embodiments.

FIG. 3 illustrates a SBFD based DL/UL resource allocation in a serving cell with back-to-back PDSCH and PUSCH scheduling in the downlink and the SBFD slot, in accordance with some embodiments.

Handling of DL and UL Signals/Channels without Sufficient Gap:

In some cases, there may not be sufficient gap between a DL and a UL signal/channel for DL-to-UL or UL-to-DL switching. For example, if $N_{TA,offset}=0$ and gNB schedules back-to-back UL and DL signals/channels in legacy UL symbols and followed by legacy DL symbols, or if gNB schedules back-to-back UL and DL signals/channels in SBFD symbols or in legacy DL symbols and followed by SBFD symbols as shown in FIG. 3. It is noted that the gap in FIG. 3 is in SBFD slot for example while it can be in DL slot in another example, which may depend on priority of signals/channels as discussed below. And also, in some cases, there would be overlapping UL and UL signals/channels (e.g., caused by two different $N_{TA,offset}$ and/or $N_{TA}$).

In one embodiment, for DL and UL signals/channels without sufficient gap, or for overlapped DL and UL signals/channels, at least one of the following operations can be performed:

Alternative 1: UE may not expect such a case. In other words, gNB should avoid such case with proper scheduling/configuration.

Alternative 2: The signal/channel with lower priority is reduced in duration to avoid overlapping or not overlap with the gap or not overlap with signal/channel with higher priority.

Alternative 3: The signal/channel with lower priority is fully or partially dropped. For example, if the DMRS symbol of signal/channel with lower priority overlaps with the gap or overlaps with the signal/channel with higher priority, the signal/channel with lower priority is fully dropped. For another example, if the signal/channel with lower priority is PUSCH or PUCCH or PRACH or PDSCH or PDCCH and the UE is not capable of partial cancellation, the signal/channel is fully dropped, otherwise, the signal/channel is partially dropped (e.g., UE only drops some of SRS symbols which overlap with the gap). For another example, if the signal/channel is CSI-RS and at least one symbol of multiple symbols associated with OCC overlaps with the gap, the whole CSI-RS is dropped.

Alternative 4: The signal/channel with lower priority is punctured for one or multiple symbols which overlaps with the gap or with signal/channel with higher priority.

Alternative 5: The signal/channel with lower priority is rate matched around one or multiple symbols which overlaps with the gap or with signal/channel with higher priority.

Alternative 6: The signal/channel with lower priority is split around one or multiple symbols which overlaps with the gap or with signal/channel with higher priority. For example, for type-B repetition, one nominal repetition of the signal/channel with lower priority is split into two actual repetitions around invalid symbol, and the invalid symbol is determined by the minimum number of symbol(s) for DL/UL switching gap or UL overlapping or pre-defined value. For example, for type-B repetition, if the starting symbol(s) of one nominal repetition of the signal/channel with lower priority is overlapped with the other signal/channel with high priority, one or multiple symbols which overlaps with the gap or with signal/channel with higher priority are considered as invalid symbols. The remaining part of the nominal repetition can be an actual repetition.

Alternative 7: The signal/channel with lower priority is postponed to next transmission opportunity. For example, for PUCCH repetitions, type-A repetition with counting based on available slots or TBoMS, a repetition of the signal/channel with lower priority overlapping with the invalid symbol for gap for DL/UL switching or UL overlapping, the repetition is postponed to next available slot.

Figure 4:
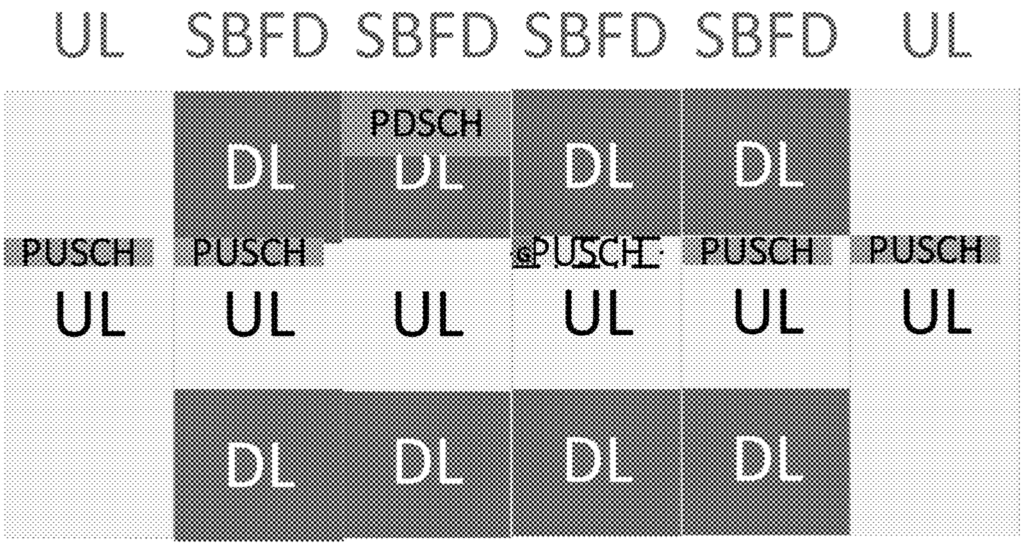
FIG. 4 illustrates an SBFD based DL/UL resource allocation in a serving cell with PUSCH repetition postponement, in accordance with some embodiments.

FIG. 4 illustrates a SBFD based DL/UL resource allocation in a serving cell with PUSCH repetition postponement due to a collision with the gap, in accordance with some embodiments. FIG. 4 provides an example. A PUSCH with 4 repetitions is configured to start from 1st UL slot. gNB schedules a PDSCH reception in 2nd SBFD slot. Then, there is a gap between PDSCH in $2^{nd}$ SBFD slot and PUSCH in $3^{rd}$ SBFD slot, and the PUSCH in $3^{rd}$ SBFD slot overlaps with the gap. So the PUSCH is dropped, and repetition is postponed. Finally, UE transmits 4 repetitions in $1^{st}$ UL slot, $1^{st}$, $4^{th}$ SBFD slot and last UL slot.

Figure 5:
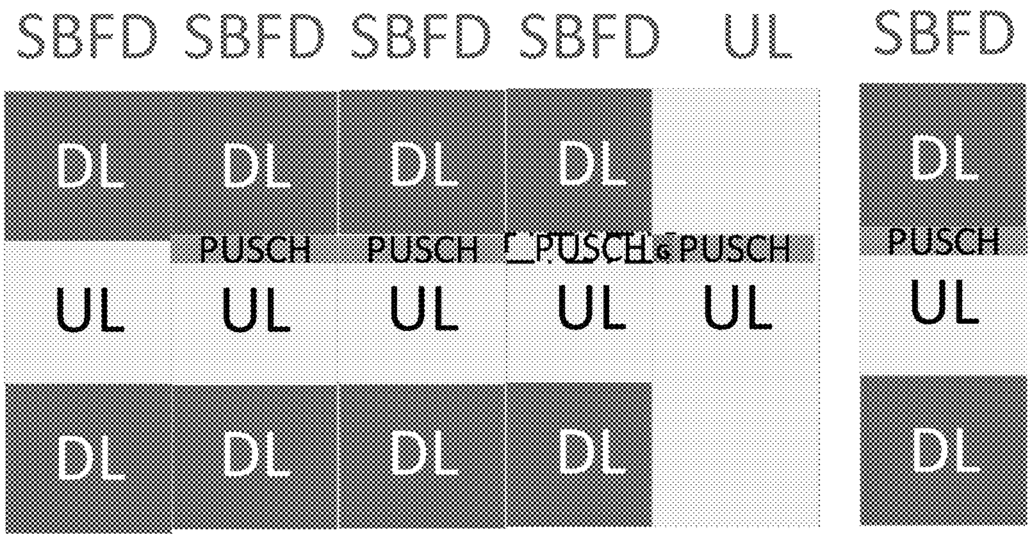
FIG. 5 illustrates an SBFD based DL/UL resource allocation in a serving cell with PUSCH repetition postponement, in accordance with some other embodiments.

FIG. 5 illustrates a SBFD based DL/UL resource allocation in a serving cell with PUSCH repetition postponement due to a collision for SBFD in an UL slot due to different UL timing, in accordance with some embodiments. FIG. 5 provides another example. A PUSCH with 4 repetitions is configured to start from $2^{nd}$ SBFD slot. If two different UL timing is applied in UL slot and SBFD slot, PUSCH repetition in $4^{th}$ SBFD slot would overlap with PUSCH repetition in UL slot. Then, PUSCH repetition in $4^{th}$ SBFD slot is dropped, and PUSCH repetition continues in UL slot and next SBFD slot. Alternatively (not shown in the figure), PUSCH repetition in $4^{th}$ SBFD slot is transmitted while PUSCH repetition in UL slot is dropped and postponed to next SBFD slot.

For Alternative 6 & Alternative 7, the invalid symbol is determined based on actual transmission. For example, if the UE has DL to receive in a SBFD symbol (e.g., gNB schedules a PDSCH in a SBFD symbol for the UE as shown in FIG. 4), the invalid symbol is needed for the gap, but no invalid symbol for the gap is needed if the UE does not need to receive DL in the SBFD symbol.

Alternative 8: Up to UE Implementation.

In one embodiment, the priority of signals/channels are determined according to at least one of rules:

Rule 1: the priority of signal/channel is determined by the start of the signal/channel in time domain. For example, the former signal/channel has higher priority than the later signals/channel.

Rule 2: the priority of signal/channel is determined by priority index, when provided. For example, the signal/channel with priority index 1 (HP) has higher priority than the signal/channel with priority index 0 (LP).

Rule 3: the priority of signal/channel is determined by DL or UL signal/channel. For example, the priority of UL signal/channel may have higher priority.

Rule 4: the priority of signal/channel is determined by signal/channel type. For example, the priority order is PUCCH>PUSCH>SRS. And the additional priority order can be considered (e.g., PUCCH with HARQ-ACK information, and/or SR, and/or LRR, or PUSCH with HARQ-ACK information of the priority index>PUCCH transmission with CSI, PUSCH transmission with CSI>PUSCH without HARQ-ACK information of the priority index of CSI, A-SRS>SP or P-CSI, PRACH on Pcell>PUCCH, PUSCH>PRACH on Scell). For another example, the priority order is PDCCH/PUCCH>PDSCH/PUSCH>SRS/CSI-RS. And the additional priority order can be considered (e.g., based on rule 3 above, PDCCH>PUCCH or PUCCH>PDCCH).

Rule 5: the priority of signal/channel is determined by UE-specific or group-specific or cell-specific signal/channel. For example, the priority order is cell-specific>group-specific>UE-specific.

Rule 6: the priority of signal/channel is determined by dynamically scheduled or configured by higher-layer. For example, the priority order is dynamically scheduled signal/channel>higher-layer configured signal/channel.

Rule 7: for two signals/channels scheduled dynamically, the priority of signal/channel is determined by the end of the PDCCH scheduling the respective signal/channel in time domain. For example, the signal/channel that is scheduled by the PDCCH with the latter ending symbol has higher priority than the signal/channel scheduled by a PDCCH with an earlier ending symbol.

It is noted that, multiple rules can be combined in order. For example, UE first applies rule 2 and then rule 3 with same priority index. Alternatively, UE first applies rule 3 regardless of priority index and then rule 2 for same signal/channel type with different priority index.

In one embodiment, for above solutions, different options can be applied to different combination of dynamically scheduled and higher-layer configured signals/channels. For example, if one the signal/channel above is scheduled signal/channel and the other is configured signal/channel, one of Alternative 2/3/4/5/6/7/8 is applied, and if both signal/channel is scheduled signal/channel, Alternative 1 is applied.

In another embodiment, for above solutions, different options can be applied to different combination of cell-specific and UE-specific signals/channels. The cell-specific signal/channel at least include SSB, valid RO/PO. For example, if one the signal/channel above is cell-specific signal/channel and the other is UE-specific signal/channel, one of Alternative 2/3/4/5/6/7/8 is applied, and if both signal/channel is UE-specific signal/channel, Alternative 1 is applied.

In another embodiment, for above solutions, different options can be applied to different combination of cell-specific and UE-specific, dynamically scheduled and higher-layer configured signals/channels. In one option, if one signal/channel above is scheduled DL signal/channel and the other is configured UL signal/channel without valid RO, or one signal/channel above is configured DL signal/channel without SSB and the other is scheduled UL signal/channel, or one signal/channel above is SSB and the other is scheduled/configured UL signal/channel, or one signal/channel above is SSB and the other is scheduled/configured UE-specific UL signal/channel, one of Alternative 2/3/4/5/6/7/8 is applied. In another option, if one signal/channel above is UE-specific configured DL and the other is UE-specific configured UL, or if one signal/channel above is cell-specific configured DL (e.g., Type 0/0A/1/2 CSS) and the other is UE-specific configured UL, or if one signal/channel above is scheduled DL and the other is scheduled UL, Alternative 1 is applied.

In another embodiment, for above solutions, different options can be applied to SBFD and non-SBFD aware UE. Alternatively, same option can be applied to both SBFD and non-SBFD aware UE.

In another embodiment, for above solutions, different options can be applied for different combination of legacy DL/UL symbol and SBFD symbols. For example, Alternative 1 is applied for the case of switch between legacy UL and DL, or legacy DL and UL symbols, while one of Alternative 2/3/4/5/6/7 is applied for the case of switch between SBFD symbols, or switch between legacy DL symbols and SBFD symbols, or switch between SBFD symbol and legacy UL symbols.

In another embodiment, for above solutions, different options can be applied for the case of UL signals/channels overlapping and the case of DL and UL signals/channels without sufficient gap. Alternatively, same option can be applied for the case of UL signals/channels overlapping and the case of DL and UL signals/channels without sufficient gap.

Although the embodiments above are described mainly for DL & UL timing and collision resolution for SBFD operation, the embodiments can also apply to other scenarios (e.g., mTRP case in legacy TDD/FDD or in full duplex systems).

Referring back to FIG. 2, some embodiments are directed to an apparatus of a generation Node B (gNB) configured for operation in a fifth-generation new radio (5G NR) network. In these embodiments, for Sub-Band Full Duplex (SBFD) communications, the gNB may be configured to communicate with two or more User Equipment (UEs) during SBFD symbols during SBFD portion 204 (see FIG. 2). In these embodiments, during any one or more of the SBFD symbols, a downlink transmission may be transmitted to at least one of the UEs simultaneously with reception of an uplink transmission from at least another of the UEs. In these embodiments, each of the SBFD symbols may span the carrier bandwidth and may comprise at least a downlink (DL) subband 208 and an uplink (UL) subband 212 within the carrier bandwidth. In these embodiments, to communicate with the two or more UE simultaneously during the SBFD symbols, the gNB may configure the UEs that are to transmit during one or more of the SBFD symbols with timing-advance offset information. The timing-advance offset information may be used by the UEs that are to transmit during one or more of the SBFD symbols to adjust a configured timing-advance for initiating an uplink transmission relative to downlink symbol timing at a UE within the one or more SBFD symbols.

In these embodiments, the timing-advance offset information may configure the UE with a timing-advance offset ($N_{TA,\ offset}$) which may be used by the UE to offset (i.e., adjust) the UE's configured timing-advance ($N_{TA}$). In some of these embodiments, the timing-advance offset may be used by the UE to delay an uplink transmission of during one or more of the SBFD symbols that follows a downlink symbol. This offset or delay, relative to the timing-advance, may provide a UL-DL switching time gap when the SBFD symbol follows a DL symbol. These embodiments are discussed in more detail below.

In some embodiments, the gNB may be configured to communicate with the UEs during non-SBFD symbols during non-SBFD downlink region 202 and non-SBFD uplink region 206 (see FIG. 2), each of the non-SBFD symbols comprising either a downlink symbol or an uplink symbol that spans the carrier bandwidth. In these embodiments, during the non-SBFD symbols that are downlink symbols, the gNB may transmit downlink transmissions to one or more of the UEs without reception of uplink transmissions. In these embodiments, during the non-SBFD symbols that are uplink symbols, the gNB may receive uplink transmissions from one or more of the UEs without downlink transmissions.

In some embodiments, only downlink symbols are communicated during non-SBFD downlink region 202 and only uplink symbols are communicated during non-SBFD uplink region 206, although the scope of the embodiments is not limited in this respect.

In some embodiments, the gNB may encode the timing-advance offset information for transmission to each of the UEs. In these embodiments, the timing-advance offset information may comprise a timing-advance offset ($N_{TA}$, offset). In some embodiments, the gNB may also encode timing-advance information for transmission to each of the UEs. In these embodiments, the timing-advance information may comprise a timing-advance ($N_{TA}$). In these embodiments, for a UE that is to transmit uplink transmissions in one or more of the SBFD symbols, the timing-advance is for use by the UEs to initiate an uplink transmission before symbol boundaries of the SBFD symbols. In these embodiments, the uplink transmissions may be transmitted with a total timing-advance comprising the timing-advance plus the timing-advance offset ($N_{TA}+N_{TA,\ offset}$). In these embodiments, the timing-advance offset information and the timing-advance information may comprise uplink timing parameters. In some embodiments, the timing-advance offset information may be determined by the UE rather than configured by the gNB.

In some embodiments, to communicate with the two or more UEs to communicate during the SBFD symbols, the gNB may encode signalling for transmission to the UEs to indicate which of the UEs is to transmit during one or more of the SBFD symbols and which of the UEs is to simultaneously receive during one or more of the SBFD symbols. In some embodiments, the downlink (DL) subband 208, DL subband 210, and the uplink (UL) subband 212 comprise a same set of the SBFD symbols that span the carrier bandwidth. As illustrated in FIG. 2, SBFD region 204 includes a plurality of SBFD symbols that span DL subband 208, DL subband 210 and UL subband 212. Non-SBFD region 202 includes a plurality of DL symbols that span the carrier bandwidth and non-SBFD region 206 includes one or more flexible symbols (F) 207 and a plurality of UL symbols that span the carrier bandwidth. Flexible symbols may comprise either UL or DL symbols.

In some embodiments, each of the SBFD symbols may span a first downlink (DL) subband 208 and the uplink (UL) subband 212 and a second downlink subband 210 may be within the carrier bandwidth. In these embodiments, during at least some of the SBFD symbols, the gNB may be configured to simultaneously transmit a downlink transmission to a first UE within the first downlink subband, transmit a second downlink transmission to a second UE with the second downlink subband, and receive the uplink transmission from a third UE within the uplink subband.

In some embodiments, the timing-advance offset information may be based on one or more of a SBFD symbol configuration, an uplink timing set indication included in a DCI format that schedules an uplink transmission, an uplink timing set configuration for uplink signals, a time-domain resource allocation (TDRA) and a multiple transmission-reception point (m-TRP) indication.

In some embodiments, for a UE that is to transmit uplink transmissions in one or more of the non-SBFD symbols that are uplink symbols, the timing-advance (e.g., $N_{TA}$) may be for use by the UE to initiate an uplink transmission before symbol boundaries of the non-SBFD symbols. In some embodiments, the gNB may configure the timing-advance offset information to the UEs for uplink transmission in one or more of the SBFD symbols separately from the timing-advance information for uplink transmissions in one or more of the non-SBFD symbols. In some of these embodiments, the gNB may configure the timing-advance offset information separately from the timing-advance information. In some embodiments, common RRC signalling, such as an RRC information element ServingCellConfigCommon may be used to configure cell specific parameters of a UE's serving cell.

In some embodiments, the timing-advance offset information may comprise a first timing-advance offset for use by the UEs for uplink transmissions in the one or more SBFD symbols that do not follow a downlink symbol and a second timing-advance offset for use by the UEs for uplink transmissions in one or more contiguous SBFD symbols that follow a downlink symbol, the second timing-advance offset information to provide a switching time gap between the downlink symbol and the SBFD symbol that follows. In these embodiments, different timing-advance offsets may be used by a UE in SBFD symbols depending on whether the SBFD symbols follow a downlink symbol. The switching time gap, provided between the downlink symbol and the SBFD symbol that follows allows a UE time to switch its transceiver from receiving to transmitting. In some embodiments, the first and second timing-advance offsets may be configured or provided to the UE separately, although this is not a requirement.

In some embodiments, the downlink symbol comprises a symbol of a PDSCH and the SBFD symbols that follows comprises a PUSCH, the second timing-advance offset information to provide a switching time gap between the PDSCH and the PUSCH. An example of this is illustrated in FIG. 3.

In some embodiments, the timing-advance information comprises a first timing-advance for use the UE for uplink transmissions in the one or more SBFD symbols and a second timing-advance for use the UE for uplink transmissions in one or more of the non-SBFD symbols. In these embodiments, different timing-advances may be used by a UE in SBFD symbols and non-SBFD symbols. In some embodiments, the first and second timing-advances may be configured or provided to the UE separately, although this is not a requirement.

In some embodiments, the gNB may refrain from scheduling an uplink transmission in an SBFD symbol when the uplink transmission would overlap with an expected downlink transmission in a prior non-SBFD symbol or an insufficient gap exists between the uplink transmission in the SBFD symbol and the expected downlink transmission in the prior non-SBFD symbol. In these embodiments, an insufficient gap may exist when there is insufficient time for the UE to perform DL-UL or UL-DL switching and the gNB has not configured the timing-advance offset to provide a sufficient gap.

In some embodiments, when an uplink transmission in an SBFD symbol is configured to overlap with an expected downlink transmission in a prior non-SBFD symbol, or when an insufficient gap is exists between the uplink transmission in the SBFD symbol and the expected downlink transmission in the prior non-SBFD symbol, the gNB may configure one of the uplink transmission in the SBFD symbol and the expected downlink transmission in the prior non-SBFD symbol to have a reduced duration. In these embodiments, configuring to reduce the duration includes at least one of puncturing, rate matching, cancellation, postpone to a next transmission opportunity and splitting a nominal repetition into two actual repetitions. In some embodiments, configuration information may be provided to the UE.

Some embodiments are directed to a non-transitory computer-readable storage medium that stores instructions for execution by processing circuitry of a generation Node B (gNB) configured for operation in a fifth-generation new radio (5G NR) network. In these embodiments, for Sub-Band Full Duplex (SBFD) communications, the processing circuitry may configure the gNB to communicate with two or more User Equipment (UEs) during SBFD symbols such that during any one or more of the SBFD symbols, a downlink transmission is transmitted to at least one of the UEs simultaneously with reception of an uplink transmission from at least another of the UEs.

Some embodiments are directed to a User Equipment (UE) configured for operation in a fifth-generation new radio (5G NR) network. In these embodiments, for Sub-Band Full Duplex (SBFD) operation, the UE may be configured to communicate with a generation Node B (gNB) during SBFD symbols. In these embodiments, each of the SBFD symbols may span an active DL bandwidth part (BWP) configured to the UE. Each of the SBFD symbols may comprise at least a downlink (DL) subband 208 and an uplink (UL) subband 212 within the active DL bandwidth part (BWP). In these embodiments, to communicate during the SBFD symbols, the UE may be configured to transmit uplink transmissions within the uplink subband to the gNB. In these embodiments, the uplink transmissions during the SBFD symbols may be transmitted with a timing-advance offset (e.g., $N_{TA,\ offset}$) to adjust the advancement in initiation of the uplink transmission relative to DL symbol timing at the UE within an SBFD symbol. In these embodiments, when the UE is transmitting the uplink transmissions within the uplink subband to the gNB, there may be a concurrent transmission of a downlink transmission to another UE from the gNB in the downlink subband if scheduled by the gNB scheduler, although the scope of the embodiments is not limited in this respect. It should be noted that the UE transmitting within an UL subband in an SBFD symbol may not know that there is actual DL transmission within the DL subbands.

In some embodiments, the UE may be further configured to decode configuration information from the gNB to indicate non-SBFD symbols. In these embodiments, each of the non-SBFD symbols may comprise either a downlink symbol or an uplink symbol that spans the active DL BWP. In these embodiments, the non-SBFD symbols that are downlink symbols may be configured for reception of downlink transmissions without uplink transmissions and the non-SBFD symbols that are uplink symbols may be configured for transmission of uplink transmissions without downlink receptions.

In some embodiments, the UE may also be configured to decode the timing-advance offset information received from the gNB, the timing-advance offset information comprising the timing-advance offset ($N_{TA,\ offset}$), and decode timing-advance information received from the gNB, the timing-advance information comprising a timing-advance ($N_{TA}$). In these embodiments, to transmit uplink transmissions in one or more of the SBFD symbols, the UE may use the timing-advance is for use by the UEs to initiate an uplink transmission before symbol boundaries of the SBFD symbols. In these embodiments, the uplink transmissions may be transmitted with a total timing-advance comprising the timing-advance plus the timing-advance offset ($N_{TA}+N_{TA,\ offset}$).

In some embodiments, the timing-advance offset information may include a first timing-advance offset for use by the UE for uplink transmissions in the one or more SBFD symbols that do not follow a downlink symbol, and a second timing-advance offset for use by the UE for uplink transmissions in one or more contiguous SBFD symbols that follow a downlink symbol. In these embodiments, the second timing-advance offset information may provide a switching time gap between the downlink symbol and the SBFD symbol that follows.

In some embodiments, the UE does not expect the gNB to schedule an uplink transmission in an SBFD symbol when the uplink transmission would overlap with an expected downlink transmission in a prior non-SBFD symbol, or an insufficient gap exists between the uplink transmission in the SBFD symbol and the expected downlink transmission in the prior non-SBFD symbol. In these embodiments, an insufficient gap may exist when there is insufficient time for the UE to perform DL-UL or UL-DL switching and the gNB has not configured the timing-advance offset to provide a sufficient gap.

In some embodiments, when an uplink transmission in an SBFD symbol is configured to overlap with an expected downlink transmission in a prior non-SBFD symbol, or when an insufficient gap is exists between the uplink transmission in the SBFD symbol and the expected downlink transmission in the prior non-SBFD symbol, the UE may reduce a duration of one of the uplink transmission in the SBFD symbol or an expected downlink reception in the prior non-SBFD symbol. In these embodiments, to reduce the duration, the UE may perform one or more of: transmit-side puncturing, rate-matching, cancellation, postponement to a next transmission opportunity, or splitting a nominal repetition into two actual repetitions.

Figure 6:
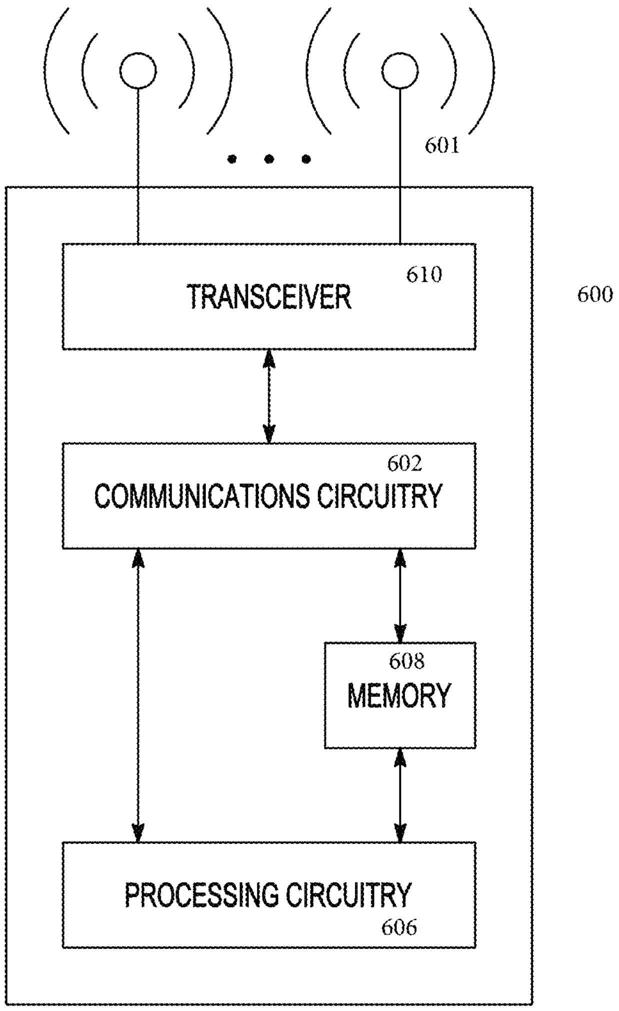
FIG. 6 is a functional block diagram of a wireless communication device, in accordance with some embodiments.

FIG. 6 illustrates a functional block diagram of a wireless communication device, in accordance with some embodiments. Wireless communication device 600 may be suitable for use as a UE or gNB configured for operation in a 5G NR or 6G network. The wireless communication device 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device. In some embodiments, the wireless communication device 600 may be configured for Ultra-High Reliability (UHR) communications in accordance with a IEEE 802.11 (e.g., WiFi 8).

In some embodiments, wireless communication device 600 may be suitable for use as a UE configured for Sub-Band Full Duplex (SBFD) operation in a fifth-generation new radio (5G NR) network and may be configured to communicate with a generation Node B (gNB) during SBFD symbols, as described ed herein.

The wireless communication device 600 may include communications circuitry 602 and a transceiver 610 for transmitting and receiving signals to and from other communication devices using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The wireless communication device 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the wireless communication device 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the wireless communication device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the wireless communication device 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the wireless communication device 600 may include one or more of a keyboard, a display, a non-volatile memory port, multiple antennas, a graphics processor, an application processor, speakers, and other mobile device elements. The display may be an LCD screen including a touch screen.

Although the wireless communication device 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the wireless communication device 600 may refer to one or more processes operating on one or more processing elements.

EXAMPLES

Example 1: A system and methods of DL reception and UL transmission in full duplex system comprising: Operation, by a gNB, to transmit DL and receive UL for different UEs in the same symbol in the same carrier for a first set of symbols, operation, by a gNB, to transmit DL without reception of UL in the same symbol in the same carrier for a second set of symbols, and operation, by a gNB, to receive UL without transmission of DL in the same symbol in the same carrier for a third set of symbols.

Example 2: Method of example 1, first UE transmit UL and second UE receives DL in the first set of symbols, first and/or second UE receives DL in the second set of symbols, first and/or second UE transmits UL in the third set of symbols.

Example 3: Method of example 2, multiple sets of UL timing parameters for UL transmission in the first set of symbols and the third set of symbols for a UE respectively are provided by gNB, where the UL timing parameter includes at least one of Nta_offset and Nta.

Example 4: Method of example 3, the set of UL timing to be used for a UL transmission can be determined according to at least one of SBFD symbol configuration, UL timing set indication in DCI scheduling UL signals/channels, UL timing set configuration for UL signals/channels, time domain resource configured for the set of UL timing, multiple TRP indication.

Example 5: Method of example 2, if a first UL transmission in the first set of symbols and UL and a second UL transmission in the third set of symbols are overlapped, one of the UL transmissions is processed to reduce the duration so that the first and second UL transmission is not overlapped.

Example 6: Method of example 3, if a UL transmission in the first set of symbols and DL in the third set of symbols, or if a DL reception in the first set of symbols and UL transmission in the second set of symbols, or if a DL reception in some of symbols in the first set of symbols and a UL transmission in other symbols in the first set of symbols, and the gap between the UL transmission and DL reception is smaller than DL-to-UL switching or UL-to-DL switching time, one of the UL transmission or DL reception is processed to reduce the duration so that the gap is no smaller than the switching time.

Example 7: Method of example 5 and example 6, the processing to reduce the duration includes at least one of puncture, rate matching, dropping, postpone to next transmission opportunity and split a nominal repetition into two actual repetitions.

Example 8: Method of example 5 and example 6, the processing is applied for the UL transmission or DL reception with lower priority.

Example 9: Method of example 8, the priority is determined by at least one of signal/channel type, UL or DL signal/channel, the time to receive DCI scheduling the DL reception or UL transmission, cell specific or UE specific signal/channel, higher-layer configured or dynamically scheduled signal/channel.

Example 10: Method of example 2, UE does not expect a first UL transmission in the first set of symbols and UL and a second UL transmission in the third set of symbols to be overlapped.

Example 11: Method of example 3, UE does not expect the gap between a UL transmission and a DL reception is smaller than DL-to-UL switching or UL-to-DL switching time.

Example 12: Method of example 10 and example 5, whether UE does not expect a first UL transmission in the first set of symbols and UL and a second UL transmission in the third set of symbols to be overlapped or UE processes one of the UL transmissions to reduce the duration so that the first and second UL transmission is not overlapped depends on at least one of signal/channel type, UL or DL signal/channel, the time to receive DCI scheduling the DL reception or UL transmission, cell specific or UE specific signal/channel, higher-layer configured or dynamically scheduled signal/channel.

Example 13: Method of example 11 and example 6, whether UE does not expect the gap between a UL transmission and a DL reception is smaller than DL-to-UL switching or UL-to-DL switching time or UE processes one of the UL transmission and DL reception to reduce the duration so that the gap is no smaller than the switching time depends on at least one of signal/channel type, UL or DL signal/channel, the time to receive DCI scheduling the DL reception or UL transmission, cell specific or UE specific signal/channel, higher-layer configured or dynamically scheduled signal/channel.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE) configured for operation in a fifth-generation new radio (5G NR) network, the apparatus comprising: processing circuitry; and memory, wherein for non-overlapping Sub-Band Full Duplex (SBFD) operation, the processing circuitry is to configure the UE to communicate with a generation Node B (gNB) during SBFD symbols that are non-overlapping in time, each of the SBFD symbols comprising at least a downlink (DL) subband and an uplink (UL) subband within a time-division duplex (TDD) carrier within a bandwidth part (BWP), wherein to communicate during the SBFD symbols, the processing circuitry is to configure the UE to transmit uplink transmissions only within resource blocks (RBs) that are both in an active UL BWP configured to the UE and the UL subband of one of the SBFD symbols to the gNB and receive downlink transmissions only within RBs that are both in an active DL BWP configured to the UE and in the DL subband of one of the SBFD symbols, wherein the uplink transmissions during the SBFD symbols are transmitted with a timing-advance offset to adjust advancement in initiation of the uplink transmission relative to DL symbol timing at the UE within an SBFD symbol, and wherein the memory is configured to store the timing-advance offset.

2. The apparatus of claim 1 wherein the processing circuitry is further configured to decode configuration information from the gNB to indicate:

non-SBFD symbols, each of the non-SBFD symbols comprising either a downlink symbol or an uplink symbol that spans the active DL BWP, wherein the non-SBFD symbols that are downlink symbols are configured for reception of downlink transmissions without uplink transmissions, and wherein the non-SBFD symbols that are uplink symbols are configured for transmission of uplink transmissions without downlink receptions.

3. The apparatus of claim 2, wherein the processing circuitry is further configured to:

decode timing-advance offset information received from the gNB, the timing-advance offset information comprising the timing-advance offset; and decode timing-advance information received from the gNB, the timing-advance information comprising a timing-advance ($N_{TA}$), wherein to transmit uplink transmissions in one or more of the SBFD symbols, the processing circuitry is to configure the UE to use the timing-advance is for use by the UE to initiate an uplink transmission before symbol boundaries of the SBFD symbols, the uplink transmissions being transmitted with a total timing-advance comprising the timing-advance plus the timing-advance offset.

4. An apparatus of a User Equipment (UE) configured for operation in a fifth-generation new radio (5G NR) network, the apparatus comprising: processing circuitry; and memory, wherein for Sub-Band Full Duplex (SBFD) operation, the processing circuitry is to configure the UE to communicate with a generation Node B (gNB) during SBFD symbols, each of the SBFD symbols spanning an active DL bandwidth part (BWP) configured to the UE and comprising at least a downlink (DL) subband and an uplink (UL) subband within the active DL bandwidth part (BWP), wherein to communicate during the SBFD symbols, the processing circuitry is to configure the UE to transmit uplink transmissions within the uplink subband to the gNB, wherein the uplink transmissions during the SBFD symbols are transmitted with a timing-advance offset to adjust advancement in initiation of the uplink transmission relative to DL symbol timing at the UE within an SBFD symbol, wherein the processing circuitry is further configured to decode configuration information from the gNB to indicate: non-SBFD symbols, each of the non-SBFD symbols comprising either a downlink symbol or an uplink symbol that spans the active DL BWP, wherein the non-SBFD symbols that are downlink symbols are configured for reception of downlink transmissions without uplink transmissions, and wherein the non-SBFD symbols that are uplink symbols are configured for transmission of uplink transmissions without downlink receptions, wherein the processing circuitry is further configured to:

decode timing-advance offset information received from the gNB, the timing-advance offset information comprising the timing-advance offset; and decode timing-advance information received from the gNB, the timing-advance information comprising a timing-advance ($N_{TA}$), wherein to transmit uplink transmissions in one or more of the SBFD symbols, the processing circuitry is to configure the UE to use the timing-advance to initiate an uplink transmission before symbol boundaries of the SBFD symbols, the uplink transmissions being transmitted with a total timing-advance comprising the timing-advance plus the timing-advance offset, wherein the timing-advance offset information comprises:

a first timing-advance offset for use by the UE for uplink transmissions in the one or more SBFD symbols; and a second timing-advance offset for use by the UE for uplink transmissions in one or more contiguous SBFD symbols that follow a downlink symbol, and wherein the memory is configured to store the timing-advance offset.

5. An apparatus of a User Equipment (UE) configured for operation in a fifth-generation new radio (5G NR) network, the apparatus comprising: processing circuitry; and memory, wherein for Sub-Band Full Duplex (SBFD) operation, the processing circuitry is to configure the UE to communicate with a generation Node B (gNB) during SBFD symbols, each of the SBFD symbols spanning an active DL bandwidth part (BWP) configured to the UE and comprising at least a downlink (DL) subband and an uplink (UL) subband within the active DL bandwidth part (BWP), wherein to communicate during the SBFD symbols, the processing circuitry is to configure the UE to transmit uplink transmissions within the uplink subband to the gNB, wherein the uplink transmissions during the SBFD symbols are transmitted with a timing-advance offset to adjust advancement in initiation of the uplink transmission relative to DL symbol timing at the UE within an SBFD symbol, wherein the processing circuitry is further configured to decode configuration information from the gNB to indicate: non-SBFD symbols, each of the non-SBFD symbols comprising either a downlink symbol or an uplink symbol that spans the active DL BWP, wherein the non-SBFD symbols that are downlink symbols are configured for reception of downlink transmissions without uplink transmissions, and wherein the non-SBFD symbols that are uplink symbols are configured for transmission of uplink transmissions without downlink receptions, wherein the processing circuitry is further configured to:

decode timing-advance offset information received from the gNB, the timing-advance offset information comprising the timing-advance offset; and decode timing-advance information received from the gNB, the timing-advance information comprising a timing-advance ($N_{TA}$), wherein to transmit uplink transmissions in one or more of the SBFD symbols, the processing circuitry is to configure the UE to use the timing-advance to initiate an uplink transmission before symbol boundaries of the SBFD symbols, the uplink transmissions being transmitted with a total timing-advance comprising the timing-advance plus the timing-advance offset, wherein the UE does not expect the gNB to schedule an uplink transmission in an SBFD symbol when:

the uplink transmission would overlap with an expected downlink transmission in a prior non-SBFD symbol, or an insufficient gap exists between the uplink transmission in the SBFD symbol and the expected downlink transmission in the prior non-SBFD symbol, wherein when an uplink transmission in an SBFD symbol is configured to overlap with an expected downlink transmission in a prior non-SBFD symbol, or when an insufficient gap is exists between the uplink transmission in the SBFD symbol and the expected downlink transmission in the prior non-SBFD symbol, the processing circuitry is configured to reduce a duration of one of the uplink transmission in the SBFD symbol or an expected downlink reception in the prior non-SBFD symbol, and wherein to reduce the duration, the processing circuitry is to configure the UE to perform one or more of: transmit-side puncturing, rate-matching, cancellation, postponement to a next transmission opportunity, or splitting a nominal repetition into two actual repetitions, and wherein the memory is configured to store the timing-advance offset.

6. An apparatus of a generation Node B (gNB) configured for operation in a fifth-generation new radio (5G NR) network, the apparatus comprising: processing circuitry;

and memory, wherein for Sub-Band Full Duplex (SBFD) communications, the processing circuitry is to configure the gNB to communicate with two or more User Equipment (UEs) during SBFD symbols, wherein during any one or more of the SBFD symbols, a downlink transmission is transmitted to at least one of the UEs simultaneously with reception of an uplink transmission from at least another of the UEs, each of the SBFD symbols spanning a carrier bandwidth and comprising at least a downlink (DL) subband and an uplink (UL) subband within the carrier bandwidth, wherein to communicate with the two or more UEs simultaneously during the SBFD symbols, the processing circuitry is to:

configure the UEs that are to transmit during one or more of the SBFD symbols with timing-advance offset information, the timing-advance offset information for use by the UEs that are to transmit during one or more of the SBFD symbols to adjust a timing-advance for initiating an uplink transmission relative to downlink symbol timing within the one or more SBFD symbols, and wherein the processing circuitry is further to configure the gNB to communicate with the UEs during non-SBFD symbols, each of the non-SBFD symbols comprising either a downlink symbol or an uplink symbol that spans the carrier bandwidth, wherein during the non-SBFD symbols that are downlink symbols, the processing circuitry is to configure the gNB to transmit downlink transmissions to one or more of the UEs without reception of uplink transmissions, and wherein during the non-SBFD symbols that are uplink symbols, the processing circuitry is to configure the gNB to receive uplink transmissions from one or more of the UEs without downlink transmissions, wherein the processing circuitry is further configured to:

encode the timing-advance offset information for transmission to each of the UEs, the timing-advance offset information comprising a timing-advance offset; and encode timing-advance information for transmission to each of the UEs, the timing-advance information comprising a timing-advance ($N_{TA}$), wherein for a UE that is to transmit uplink transmissions in one or more of the SBFD symbols, the timing-advance is for use by the UEs to initiate an uplink transmission before symbol boundaries of the SBFD symbols, the uplink transmissions being transmitted with a total timing-advance comprising the timing-advance plus the timing-advance offset, wherein for a UE that is to transmit uplink transmissions in one or more of the non-SBFD symbols that are uplink symbols, the timing-advance is for use by the UE to initiate an uplink transmission before symbol boundaries of the non-SBFD symbols, wherein the memory is configured to store the timing-advance offset information.

7. The apparatus of claim 6, wherein the processing circuitry is to refrain from scheduling an uplink transmission in an SBFD symbol when:

the uplink transmission would overlap with an expected downlink transmission in a prior non-SBFD symbol, or an insufficient gap exists between the uplink transmission in the SBFD symbol and the expected downlink transmission in the prior non-SBFD symbol.

8. The apparatus of claim 6 wherein when an uplink transmission in an SBFD symbol is configured to overlap with an expected downlink transmission in a prior non-SBFD symbol, or when an insufficient gap is exists between the uplink transmission in the SBFD symbol and the expected downlink transmission in the prior non-SBFD symbol, the processing circuitry is configured to:

configure one of the uplink transmission in the SBFD symbol and the expected downlink transmission in the prior non-SBFD symbol to have a reduced duration.

9. The apparatus of claim 6, wherein the timing-advance offset information is based on one or more of a SBFD symbol configuration, an uplink timing set indication included in a DCI format that schedules an uplink transmission, an uplink timing set configuration for uplink signals, a time-domain resource allocation (TDRA) and a multiple transmission-reception point (m-TRP) indication.

10. The apparatus of claim 6 wherein the processing circuitry is to configure the timing-advance offset information to the UEs for uplink transmission in one or more of the SBFD symbols separately from the timing-advance information for uplink transmissions in one or more of the non-SBFD symbols.

11. The apparatus of claim 6 wherein the timing-advance offset information comprises:

a first timing-advance offset for use by the UEs for uplink transmissions in the one or more SBFD symbols; and a second timing-advance offset for use by the UEs for uplink transmissions in one or more contiguous SBFD symbols that follow a downlink symbol.

12. The apparatus of claim 11 wherein the timing-advance information comprises:

a first timing-advance for use the UEs for uplink transmissions in the one or more SBFD symbols; and a second timing-advance for use the UEs for uplink transmissions in one or more of the non-SBFD symbols.

13. The apparatus of claim 11, wherein the second timing-advance offset information to provide a switching time gap between the downlink symbol and the SBFD symbol that follows.

14. The apparatus of claim 11, wherein the downlink symbol comprises one or more of: a physical downlink shared channel (PDSCH), a physical downlink control channel (PDCCH), and a DL reference signal, and wherein the SBFD symbols that follow the downlink symbols comprises one or more of a physical uplink shared channel (PUSCH), a physical uplink control channel (PUCCH), and an UL reference signal.

* * * * *